United States Patent

Thron et al.

[15] 3,648,252

[45] Mar. 7, 1972

[54] MULTIPROGRAMMABLE, MULTIPROCESSOR COMPUTER SYSTEM

[72] Inventors: John E. Thron, Cambridge; William E. Woods, Natick, both of Mass.; Ronald Bellettiere, Philadelphia, Pa.; Howard Stein, University Heights, Ohio

[73] Assignee: Honeywell Inc., Minneapolis, Minn.

[22] Filed: Nov. 3, 1969

[21] Appl. No.: 873,381

[52] U.S. Cl. .......... 340/172.5

[51] Int. Cl. .......... G06f 9/18

[58] Field of Search .......... 340/172.5

[56] References Cited

UNITED STATES PATENTS

| | | | |
|---|---|---|---|
| 3,029,414 | 4/1962 | Schrimpf | 340/172.5 |
| 3,274,554 | 9/1966 | Hopper et al. | 340/172.5 |
| 3,398,405 | 8/1968 | Carlson et al. | 340/172.5 |
| 3,405,394 | 10/1968 | Dirac | 340/172.5 |
| 3,411,139 | 11/1968 | Lynch et al. | 340/172.5 |
| 3,449,722 | 6/1969 | Tucker | 340/172.5 |
| 3,478,321 | 11/1969 | Cooper et al. | 340/172.5 |
| 3,483,521 | 12/1969 | Frasier et al. | 340/172.5 |
| 3,421,150 | 1/1969 | Quosig et al. | 340/172.5 |
| 3,373,408 | 3/1968 | Ling | 340/172.5 |
| 3,479,649 | 11/1969 | Bahrs et al. | 340/172.5 |
| 3,566,357 | 2/1971 | Ling | 340/172.5 |

OTHER PUBLICATIONS

IBM 7080 Data Processing Reference Manual, Form A22-6560- 1 (1961) Pages 11- 18, 26- 27 and 62- 64; P.O. Box 390; Poughkeepsie, N.Y.

*Primary Examiner*—Paul J. Henon
*Assistant Examiner*—Harvey E. Springborn
*Attorney*—Fred Jacob and Ronald T. Reiling

[57] ABSTRACT

A multiprogrammable, multiprocessor computer system is disclosed including at least one central processor for performing arithmetic and logic operations, at least one input/output processor for performing input and output operations, storage means connected with each of the processors and adapted for storing central processor programs associated with the central processor and channel programs associated with the input/output processor, and a multiprocess controller connected to each of the processors for accepting control of a program from a processor in response to an interrupt and providing control of another program to that particular processor in accordance with a predetermined priority arrangement including a plurality of activity state indicators, one associated with each of the programs in the storage means, each of the activity state indicators representing the activity state of its respective program.

10 Claims, 11 Drawing Figures

JOHN E. THRON
WILLIAM E. WOODS
RONALD BELLETTIERE
HOWARD STEIN
INVENTORS.

BY Anthony J. Sarli, Jr.
ATTORNEY.

JOHN E. THRON
WILLIAM E. WOODS
RONALD BELLETTIERE
HOWARD STEIN
INVENTORS.

BY Anthony J. Sarli Jr.
ATTORNEY.

JOHN E. THRON
WILLIAM E. WOODS
RONALD BELLETTIERE
HOWARD STEIN
INVENTORS.

BY Anthony J. Sarli Jr.
ATTORNEY.

JOHN E. THRON
WILLIAM E. WOODS
RONALD BELLETTIERE
HOWARD STEIN
INVENTORS.
BY Anthony J. Sarli Jr.
ATTORNEY.

JOHN E. THRON
WILLIAM E. WOODS
RONALD BELLETTIERE
HOWARD STEIN
INVENTORS.

BY Anthony J. Sarli Jr.

ATTORNEY.

JOHN E. THRON
WILLIAM E. WOODS
RONALD BELLETTIERE
HOWARD STEIN
INVENTORS.

BY [signature]
ATTORNEY

MULTIPROGRAMMABLE, MULTIPROCESSOR COMPUTER SYSTEM

BACKGROUND OF INVENTION

This invention relates to a multiprogrammable, multiprocessor computer system and more particularly to such a computer system utilizing a multiprocess controller for controlling execution of transfers of control of and monitoring the activity states of all programs in the system.

A primary aim in the design of computer systems is to make maximum utilization of all of the system equipment such as central or computational processors, input/output processors and other peripheral devices, in order to minimize the cost and time required to process a program with such systems. One approach to this problem is the design of computer systems that are capable of some sort of simultaneous operation of more than one of their processors or peripheral devices. For example, in one contemporary multiprogrammable system when execution of a central processor program by a central processor is interrupted by an instruction in that program requiring input/output processing by a particular device the central processor ceases execution of that program and begins execution of a supervisory program that causes the central processor to seek that particular device required by the central processor program and then transfer control to that device for performance of the input/output operation. If the designated device happens to be busy, the central processor waits until the device is free to transfer control. In the meantime, the primary function of the central processor, arithmetic and logic processing, is subordinated. When control has been transferred to the selected device, then the central processor may return to performing its primary duties with another central processor program awaiting processing.

Another contemporary multiprogrammable computer system achieves some degree of desired concurrence using a central processor served by a central memory and a plurality of peripheral devices each of which may store a user program, execute certain instructions, and communicate with input/output channels, the other peripheral devices and central memory. Suitable control means cause each peripheral device to be interrogated periodically for requests for the services of the central processor. While a particular peripheral device seeks the services of the central processor for its program and while its program is receiving those services, that device is generally not performing any other processes, but is dormant. In such a system the central processor is continuously active and perhaps fully utilized. However, all of the peripheral devices are not fully utilized, and the partial concurrence is achieved at the expense of using a plurality of peripheral devices, which themselves are substantial, limited capability computers, operating in a type of time sharing arrangement.

An addition shortcoming of certain conventional computer systems is their limited modular capability. For example, in the two types of systems discussed supra, the former system may require a revision of the central processor, input/output devices and the supervisory program should any changes to the central processor input/output arrangement be made. Similarly the latter system requires extensive rearrangement of interconnections of all the peripheral devices upon addition or subtraction of such a device and significant modification to the system controls for such changes or for modifications to the central processor.

SUMMARY OF INVENTION

It is therefore an object of this invention to provide a multiprocessor, multiprogrammable computer system capable of concurrent processing of a plurality of programs or parts of programs making maximum utilization of all the system processors.

It is another object of this invention to provide such a multiprocessor, multiprogrammable modular computer system which enables addition, subtraction and modification of any of the processors with minimal effect on the other system processors.

The invention features a multiprogrammable, multiprocessor computer system including at least one central processor for performing arithmetic and logic operations and at least one input/output processor for performing input and output operations. Storage means, adapted for storing central process programs associated with the central processor and channel programs associated with the input/output processor, is connected with each of those processors. A multiprocess controller uses activity state indicators for maintaining a record of the activity state of each of the programs in the storage means including those programs being processed by the processors. The multiprocess controller accepts control of a program from a processor in response to an interrupt and provides control of another program to that particular processor in accordance with a predetermined priority arrangement including the activity states represented by the various activity state indicators.

DISCLOSURE OF PREFERRED EMBODIMENT

Other objects, features and advantages will occur from the following description of a preferred embodiment and the accompanying drawings, in which.

Figure 1:
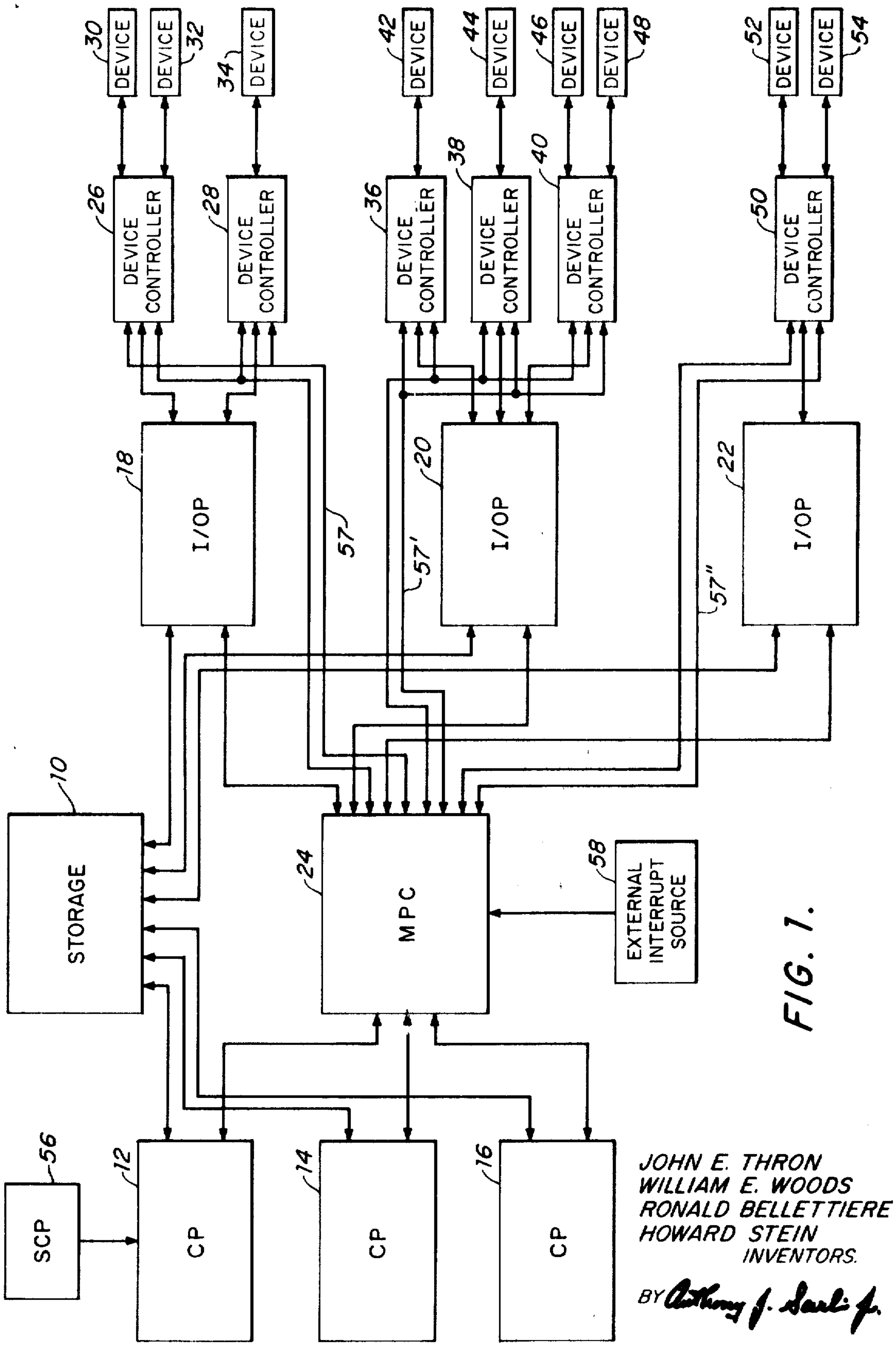
FIG. 1 is a block diagram of a multiprocessor, multiprogrammable computer system according to this invention having a plurality of central processors and of input/output processors each input/output processor having one or more device controllers with one or more devices.

The invention may be embodied in a multiprocessor, multiprogrammable computer system, FIG. 1, including a storage 10 interconnected with a plurality of central processors 12, 14, and 16, and a plurality of input/output processors, 18, 20, and 22. Although in the example of FIG. 1 the number of central processors is equal to the number of input/output processors, this is not necessary for any number of either type of processor may be used in this system. Each of the central processors 12. 14. 16 is interconnected with a multiprocess controller 24 as are each of the input/output processors 18, 20, 22. Each of the input/output processors may be interconnected with one or more device controllers, and each such device controller may be interconnected with one or more devices such as tape drives, printout devices, display devices and other similar equipment. Input/output processor 18 is interconnected with device controller 26 and a second device controller 28. Device controller 26 is interconnected with two devices 30 and 32 and device controller 28 is interconnected with a single device 34. Input/output processor 20 is interconnected with device controllers 36, 38, and 40. Device controller 36 is interconnected with a single device 42 and device controller 38 is interconnected with a single device 44, while device controller 40 is interconnected with two devices 46 and 48. Input/output processor 22 is interconnected with a single device controller 50 which is interconnected with two devices 52 and 54. The system may be initialized by means of controls on the system control panel 56 here shown connected to central processor 12, but which may be connected to any one or more of the central processors of the system. After the bootstrapping operation performed by the system initialization, there is contained in storage a plurality of central processor programs executable by the central processors and a plurality of channel programs executable by the input/output processors. In the multiprocess controller 24 there is a first plurality of activity state indicators which maintain a record of the activity state of each of the central processor programs and a second plurality of activity state indicators which maintain a record of the activity state of each of the channel programs. When there is more than one central processor or more than one input/output processor, each of the central processors may be assigned to a particular portion of the first plurality of activity state indicators and each of the input/output processors may be assigned to a particular portion of the second plurality of activity state indicators or all the central processors may be connected to the first plurality of activity state indicators through a priority circuit and all the input/output processors may be connected to the second plurality of activity state indicators through a priority circuit. When an interrupt occurs a program, either a central processor program or channel program may be upgraded to a higher activity state, or a program may be downgraded to a lower activity state, or both conditions may be effected by the same interrupt. A program presently being executed by either a central processor or input/output processor may be one of the ones effected by having its activity state downgraded. Immediately upon the upgrading and/or downgrading of the activity states of particular programs the changed activity states are reflected by their activity state indicators; the multiprocess controller constantly presents to the processors the identity of the highest activity state program of the highest priority. The identity of the program of the highest activity state is supplied to its processor for execution. If there is more than one program in the highest activity state, the one of those programs having the highest priority (determined in a fixed and arbitrary manner by the location of the program status words in storage) takes precedence. Thus, when an interrupt occurs it may downgrade an executing program which may or may not cause it to lose its position as the highest activity state highest priority program, or it may downgrade another program; the interrupt may upgrade a program or it may both upgrade the activity state of one program and downgrade that of another. Whatever the effect of an interrupt if in changing the activity state of a program it changes the identity of the highest activity state highest priority program, the program presently being executed, then the currently executing program is replaced by the new highest activity state highest priority program as the one to be executed by the particular processor. For example, if an interrupt occurs which upgrades and/or downgrades programs other than a particular program being executed and the particular program being executed is still the highest activity state highest priority program, its execution continues uninterrupted. However, if the interrupt causes another program to become the highest activity state highest priority program, such as by downgrading the activity state of the presently executing program, than execution of the new highest activity state highest priority program is begun. In this manner none of the processors are ever left idle and none of the processors are involved in transferring control to others processors. Therefore each processor may devote its full efforts to performing processes for which it was primarily designed.

There are four classes of interrupts which may cause a change in the identity of the highest priority program and result in the transfer of control of a program between a processor and the multiprocess controller. The first class includes an order given by a program being executed by a particular processor requesting the upgrading or downgrading of the activity state of a program or the upgrading of one program and the downgrading of another. This type of interrupt can originate in either a central processor or an input/output processor. A second class of interrupt originates in the input/output processor for service of a particular channel program by a device controller, the selected device controller indicates that it is or is not available to provide its service to that identified channel program. A third class of interrupt originates also in the input/output processor means when a device controller indicates that it has completed servicing a particular channel program in response to the request of the input/output processor. The fourth class of interrupt occurs to the central processor and originates in an external interrupt source such as would be provided to monitor a particular operation such as an industrial process or the like. A priority bus 57, 57', 57'' is associated with each input/output processor for interconnecting the multiprocess controller and all of the device controllers associated with that input/output processor for interconnecting the multiprocess controller and all of the device controllers associated with that input/output processor for resolving conflicts between the multiprocess controller and those device controllers when two or more of them simultaneously request the services of that input/output processor. The external interrupt comes from an external interrupt source 58 in FIG. 1.

Figure 2:
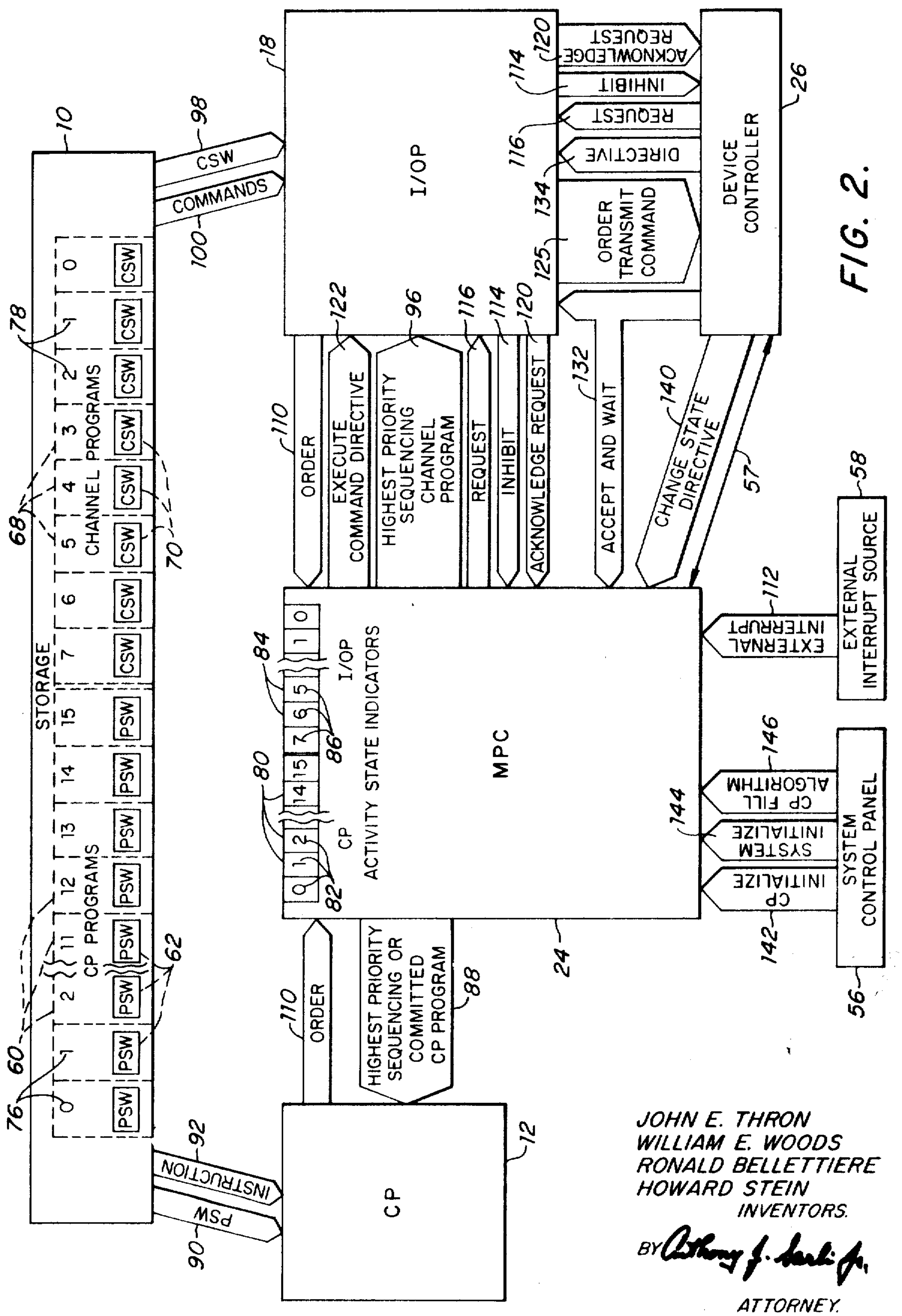
FIG. 2 is a block diagram of the multiprocessor, multiprogrammable computer system similar to that of FIG. 1 showing the communication between the various components of the system.

The manner in which the multiprogrammable, multiprocessor computer system of this invention functions to free the processors from operation involved in transfer of control of the programs so that those processors may be fully devoted to performing the operations for which they were specifically intended, may be better understood with reference to FIG. 2 where all the central processors except central processor 12, and all the input/output processors except input/output processor 18, all device controllers except device controller 26 and all devices have been omitted to promote understanding of the invention.

Storage 10 is shown containing 16 central processor programs 60 each having a program status word 62. The program status word 62 includes two 32-bit words PS1 64 and PS266, FIG. 3. Contained in bits 12 through 30 of PS1 64 is the address of the next instruction to be performed of the program corresponding to that program status word 62. Storage 10 also contains eight channel programs 68 each having a channel status word 70. The channel status word 70 includes two 32-bit words CS1 72 and CS2 74, FIG. 4. Bits zero through seven of CS1 72 contain the status of the operation most recently performed and bits 12 through 30 contain the pointer or address of the next command to be performed of the corresponding channel programs 68. Bits zero through 11 of CS2 74 contain the range or numbers of locations in storage 10 to be involved in a particular data transfer involving a device controller and bits 12 through 30 contain the address at which that range begins. Both the locations of the central processor programs 60 and channel programs 68 are stored in accordance with a priority arrangement wherein the central processor or channel programs 60, 68 in the storage position designated by the lowest number 76, 78 respectively, has the highest priority and vice versa: amongst the central processor programs 60 the program at the position designated 0 is highest priority and that at position 15 is lowest priority, similarly, amongst the channel programs 68 the program at the position designated 0 is highest priority and that at the position designated 7 is lowest priority. The priority arrangement and number of programs or positions are arbitrary and in no way limit the invention.

Contained in the multiprocess controller 24 are 16 central processor activity state indicators 80 corresponding with the 16 central processor programs 60 and bearing the same priority relationships, indicated by numbers 82, as their respective programs 60. Similarly, there are eight channel program activity state indicators 84 corresponding to the eight channel programs 68 and bearing the same priority relationship, as indicated by numbers 86, as their respective channel programs 68.

Each of the central processor programs 60 may be in any one of four activity states represented by their respective activity state indicators 80: STOPPED, the program is inactive and cannot be placed directly into an active state; ENABLED, the program is inactive but can be placed in an active state; SEQUENCING, the program is active and is a candidate for or is undergoing instruction execution by the central processor 12; COMMITTED, the program is active and there has been an interrupt requesting its execution while it was in the SEQUENCING state. This is a buffered SEQUENCING state which, when that program has its activity state downgraded at the completion of its present execution phase, leaves that program in the active SEQUENCING state whereby the processor or device controller awaiting that program can gain control over the program which would not be possible had the program been in a SEQUENCING state that is downgraded to the inactive ENABLED state.

Each of channel programs 68 may be in any one of four activity states represented by their respective activity state indicators 84: STOPPED, the program is inactive and no activity on its part is presently required; WAITING, the program is inactive after having attempted to become engaged with a busy device controller and is waiting for that device controller to become available; SEQUENCING, the program is active and is undergoing command execution by the input/output processor 18; ENGAGED, the program is active and is engaged to a device controller which now has accepted control over that program to effect a data transfer. Of the four activity states of the central processor programs 60, STOPPED and ENABLED are referred to as inactive states and SEQUENCING and COMMITTED as active. Similarly, of the four activity states of the channel programs 68, STOPPED and WAITING are referred to as inactive states and SEQUENCING and ENABLED as active. There may be a plurality of central processor or channel programs in each of the four activity states available to that particular type of program.

Multiprocess controller 24 provides to central processor 12 the identification of the highest priority, according to numbers 82, SEQUENCING or COMMITTED programs 60, block 88, as represented by activity state indicators 80. Execution of a central processor program 60 is begun by transferring, block 90, from storage 10 to central processor 12 the program status word 62, FIG. 3, for that particular program. Central processor 12 then refers to bits 12 through 30 of PS1 64 to obtain the address of then retrieve from storage, block 92, the next instruction of the central processor program 62 to be executed. Each time a new instruction is interpreted and executed by the central processor 12, the address indicated at bits twelve through thirty of PS1 64 is incremented to provide the address of the next instruction to be executed. Execution continues thusly until an interrupt occurs which may cause another program to replace the one currently being executed by the central processor 12, as the highest priority SEQUENCING or COMMITTED central processor program 60. When this occurs an interrupt algorithm in central processor 12 is activated whereby the program status word 62 of the currently executing program is returned to storage 10 and replaced with the program status word 62 of the now highest priority SEQUENCING or COMMITTED central processor program 60.

Similarly, multiprocess controller 24 provides to input/output processor 18 the identification of the highest priority, according to number 86, SEQUENCING channel program 68, block 96, as represented by activity state indicators 84. Execution of a channel program 68 is begun by transferring, block 98, from storage 10 to input/output processor 18 the CS1 72 portion of the channel status word 70, FIG. 4. Input/output processor 18 then refers to bits 12 through 30 of CS1 72 to obtain the address of and then retrieves from storage, block 100, the next command 94, FIG. 5, of the channel program 68. Each time a new command is interpreted and executed by the input/output processor 18, the address indicated at bits 12 through 30 of CS1 72 is incremented to produce the address of the next command to be executed. Execution continues thusly until an interrupt occurs which may cause another program to replace the one currently being executed by the input/output processor 18, as the highest priority SEQUENCING channel program 68. When this occurs the CS1 72 portion of channel status word 70 of the currently executing program is returned to storage 10 and replaced with the CS1 72 portion of the channel status word 70 of the now highest priority SEQUENCING channel program 68.

Figure 5:
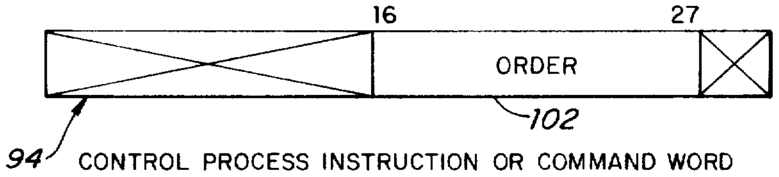
FIG. 5 is a diagram of a control process instruction word or control process command word.

The steps of a central process program 60 are referred to as instructions and those of a channel program 68 are referred to as commands. As seen in FIG. 5, both these instructions and commands are 32-bit words 94 which typically contain various types of information useful to their processing by the system but not necessary to the description of this invention. However, one type of instruction and one type of command, known respectively as control process instruction and control process command, contain identical portions in bits 16 through 27 referred to as order 102. This order 102 shown in more detail in FIG. 6 contains three items of information to be submitted to the multiprocess controller 24; the target process portion 104, bits 16 through 23, which identifies a program whose activity state is to be upgraded; the inter process portion 106, bit 24 which indicates how that target program is to have its activity state upgraded; and the intra process portion 108, bits 26 and 27 which indicates whether and how the program issuing the order 102 is to be downgraded. An order 102 may originate either from a channel program 68 being executed by the input/output processor 18 or from a central processor program 60 being executed by central processor 12, blocks 110. These orders, then, constitute one class of interrupts which change the activity states of central processor and channel programs, and an order 102 as originating in either type of program may have as its target program a program of either type. The following CHART I, indicates the changes that may be effected by the inter process and intra process portions of an order when applied to central processor programs 60 and channel programs 68 and the codes that represent those changes.

CHART I

| Channel program change | | Code | Central processor program change |
|---|---|---|---|
| To SEQ | INTER | 0 | STOP to ENABLE. |
| STOP or WAIT to SEQ | INTER | 1 | ENABLE to SEQ or SEQ to COMMITTED. |
| No change | INTRA | 00 | No change. |
| Do | INTRA | 01 | SEQ to EN or COM to SEQ. |
| To STOP | INTRA | 11 | STOP. |

A fourth class of interrupt which effects only the central processor programs 60 is the external interrupt, block 112, from external interrupt source 58. This interrupt is able to upgrade the activity state of a central processor program 60 by a signal to its particular activity state indicator 80 only if the specially provided mask flip-flop associated with each central processor activity state indicator 80 has been enabled by a change represented by the code 0, CHART I, provided by the inter process portion 106 of order 102.

The interaction of an input/output processor with a multiprocess controller is more complex than that of a central processor because of the requirement of the input/output processor to service requests of all the controllers associated with it, i.e., all its device controllers and the multiprocess controller. If there is one or more channel programs in the SEQUENCING state, block 96, as represented by one or more of activity state indicators 84, and there is no inhibit, block 114, from the input/output processor 18 indicating that it is preoccupied with execution of another channel program, with a date transfer, or with attempting to transfer control to or from a controller, a request, block 116, is sent to input/output processor 18. When that request reaches the input/output processor 18 an inhibit is delivered to all device controllers and the multiprocess controller 24. With the appearance of the inhibit all controllers not presently making a request are prevented from subsequently doing so. Meanwhile, priority bus 57 interconnecting all controllers resolves by a predetermined priority scheme any conflict arising from concurrent requests from more than one controller for services of the input/output processor 18. Thus, when an acknowledge, block 120, is made of the request after issuance of the inhibit, only the request of the highest priority controller is approved thereby enabling that controller to direct the input/output process 18 to provide the required service.

In the case of the multiprocess controller 24, a request is initiated by the presence of a channel program in the SEQUENCING state. Upon receipt of an acknowledge the multiprocess controller 24 provides an execute command directive, block 122, that causes the input/output processor 18 to execute the command addressed by the CS1 72 portion of the channel status word 70 specified by block 96.

Figure 7:
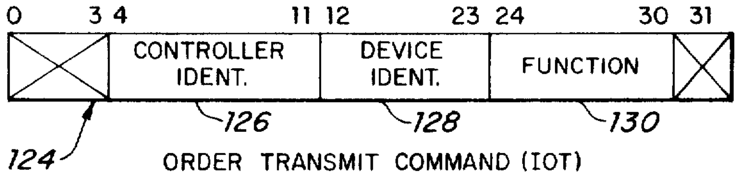
FIG. 7 is an order transmit command used to transfer control of a channel program to a device controller.

In the case of the device controllers, typified for purposes of this description by device controller 26, the request is initiated by an order transmit command 124, FIG. 7, block 125, FIG. 2. The pertinent parts of the order transmit command 124 are: the controller identification 126, bits 4 to 11 That identify the one of the device controllers whose services are sought; the device identification 128, bits 12 through 23, that identify the device whose services are sought; and the function 130, bits 24 through 30, that indicates the service required of the identified device controller and device.

In response to an order transmit command 124, the addressed device controller indicates whether or not it is busy on the accept and wait lines, block 132. If the device controller is busy a wait signal is sent to multiprocess controller 24 to set the activity state indicator 84 of the instant program to the WAITING state and is sent to input/output processor 18 where it causes the address or pointer portion of CS1 72 to be decremented, to preserve the rejection instruction. If the addressed device controller is not busy an accept is delivered to multiprocess controller 24 to set the activity state indicator 84 of the instant program to the ENGAGED state. In this case the pointer portion of CS1 72 is incremented. Further, the appearance of an accept enables a request to be sent to the input/output processor 18 which action precipitates the request, inhibit, priority, acknowledge sequence of events as previously described in the discussion of the operation of the multiprocess controller 24. These accept and wait signals constitute a second class of interrupts. The signals that may appear on the accept and wait lines are illustrated in CHART II.

| Accept and wait Code | Changes in activity state of insuring program |
|---|---|
| 00 | None |
| 10 | None |
| 01 | Wait |
| 11 | engaged |

CHART II

Figure 8:
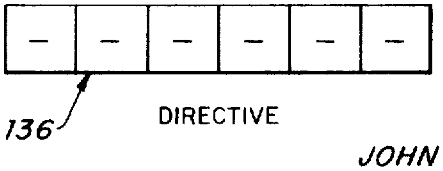
FIG. 8 is a diagram of a directive emanating from a device controller in response to an order transmit command, or certain conditions peculiar to the type of device.

When the device controller receives an acknowledge from the input/output processor 18, it sends back a directive, block 134, informing the input/output processor 18 of the service it requires. There are a number of types of directives 136 each having the form of a six-bit code, FIG. 8. An execute command directive may originate in the multiprocess controller 24, block 122, as described supra, in the input/output processor 18 when the end of range is reached in the range portion of the CS2 74 portion of a channel status word 70, or in a device controller when channel program execution is required in conjunction with a data transfer. All other directives originate in the device controllers. The execute command directive that originates in a device controller and the other directives that originate in device controllers are derived from the function 130 portion of the order transmit command 124, FIG. 7 or from certain device conditions. The various directives, their cause, origin, destination, and code are displayed in CHART III.

CHART III

| Directive | Origin | Destination | Cause | Code |
|---|---|---|---|---|
| EXECUTE COMMAND | I/OP | I/OP | End of range in CS2. | 0 0 0 0 0 0 |
| Do | MPC | I/OP | Program state is SEQ. | 0 0 0 0 0 0 |
| Do | D.C. | I/OP | Require program execution. | 0 0 0 0 0 0 |
| CHANGE STATE | D.C. | MPC | End of D.C. control over a channel program. | |
| 1. Place channel program in SEQUENCE state | | | | 0 0 0 0 0 1 |
| 2. Place all WAITING channel programs in SEQUENCING state | | | | 0 0 0 0 1 0 |
| 3. Do 1. and 2. | | | | 0 0 0 0 1 1 |
| CHANGE STATUS | D.C. | I/OP | Transfer status from D.C. to CS2. | 0 0 0 1 0 0 |
| TRANSFER | D.C. | I/OP | | |
| 1. Input transfer | | | | 0 0 1 - - - |
| 2. Output transfer | | | | 0 1 1 - - - |

The last three blank bits of the code, CHART III, for input and output transfer directives are reserved for specific details that may be required of a date transfer operation. The execute command directive, change status directive, and transfer directive originating in a device controller are sent to input/output processor 18, block 134, and the change state directive originating in a device controller is sent to the multiprocess controller 24, block 140. The change state directive constitutes a third class of interrupts.

Communications from the system control panel 56 include a central processor initialize, block 142, which sets the central processor to an initialized condition, a system initialize, block 144, which sets the system to an initialized condition, and the central processor fill algorithm, block 146, which is used to enter programs into a cleared system.

From the foregoing description it may be understood that whenever the central processor is executing a program that is no longer the highest priority program seeking its services, as determined by the multiprocess controller, control over that program is relinquished to the multiprocess controller and control of the higher priority program is given to the central processor. Similarly, the multiprocess controller is continually providing to the input/output processor the highest priority sequencing program seeking its services, which that processor will accept as soon as it is freed from servicing higher priority device controllers. Further, while the device controller is delivering data to a device or receiving data from a device, that device controller assumes control over the program and the input/output processor is free to service other device controllers or the multiprocess controller. Many or all of the device controllers may be so engaged with various programs.

The multiprocess controller, then, continuously records the activity state of every program being processed by the system, and only relinquishes control over the programs when they require processing by one of the processors and that processor is available to process them, As a result, none of the processors retain control over a program except to perform the specific tasks indigenous to the processor: for central processors they are computational tasks, for input/output processors they are data transfer tasks. In this manner, maximum effective utilization may be made of each of the processors of the system and the programs to be processed may be most efficiently and quickly carried out. Further with the system organization of this invention, the system may be increased or decreased in size or capacity by the addition or removal of processors without affecting the performance of any of the other processors. Only the interface between the particular processors to be added or removed and the multiprocessor controller is involved. With this system a truly modular system organization is achieved.

Figure 3:
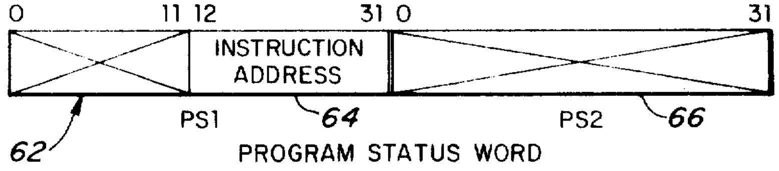
FIG. 3 is a diagram of a program status word.
Figure 4:
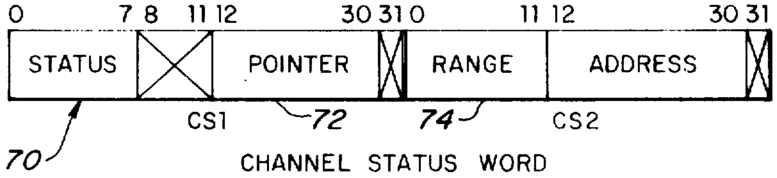
FIG. 4 is a diagram of a channel status word.
Figure 6:
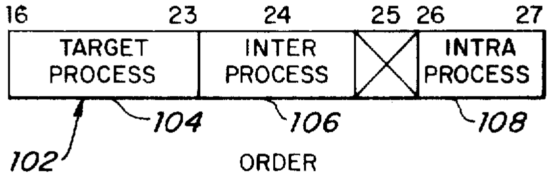
FIG. 6 is a diagram of an order contained in a control process instruction or command.
Figure 9:
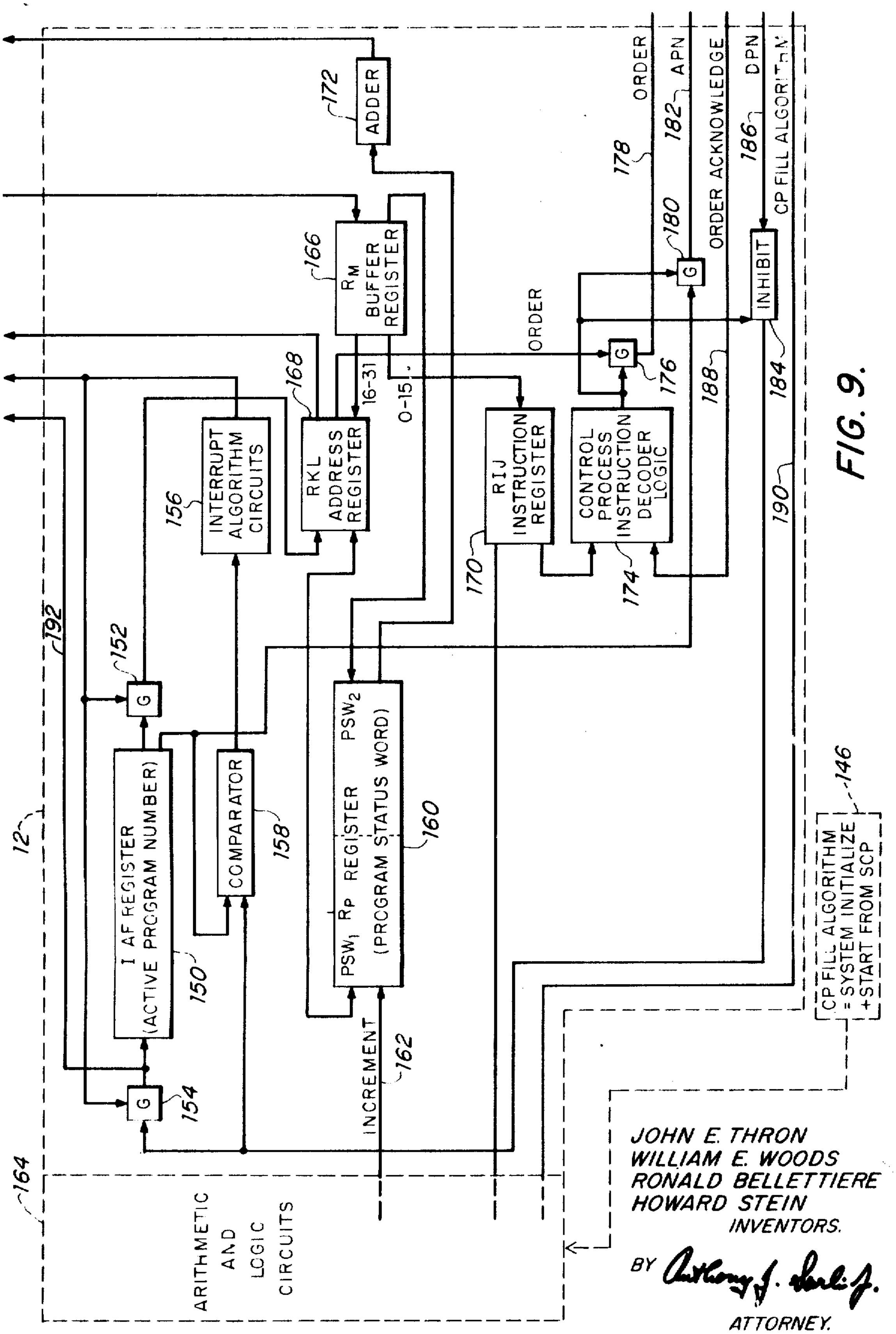
FIG. 9 is a detailed block diagram of portions of a central processor as shown in FIG. 1.
Figure 10:
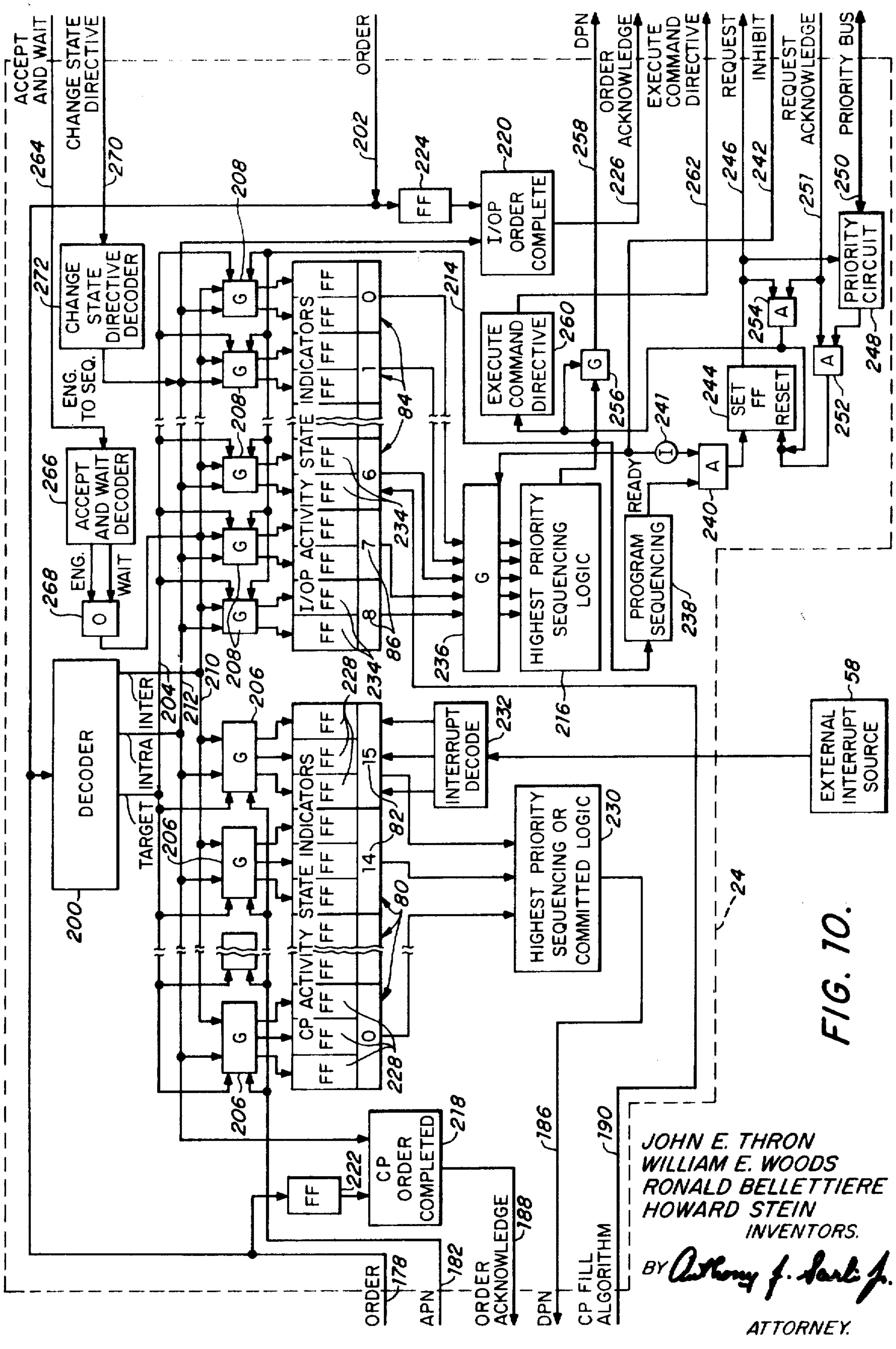
FIG. 10 is a detailed block diagram of portions of a multiprocess controller as shown in FIG. 1.
Figure 11:
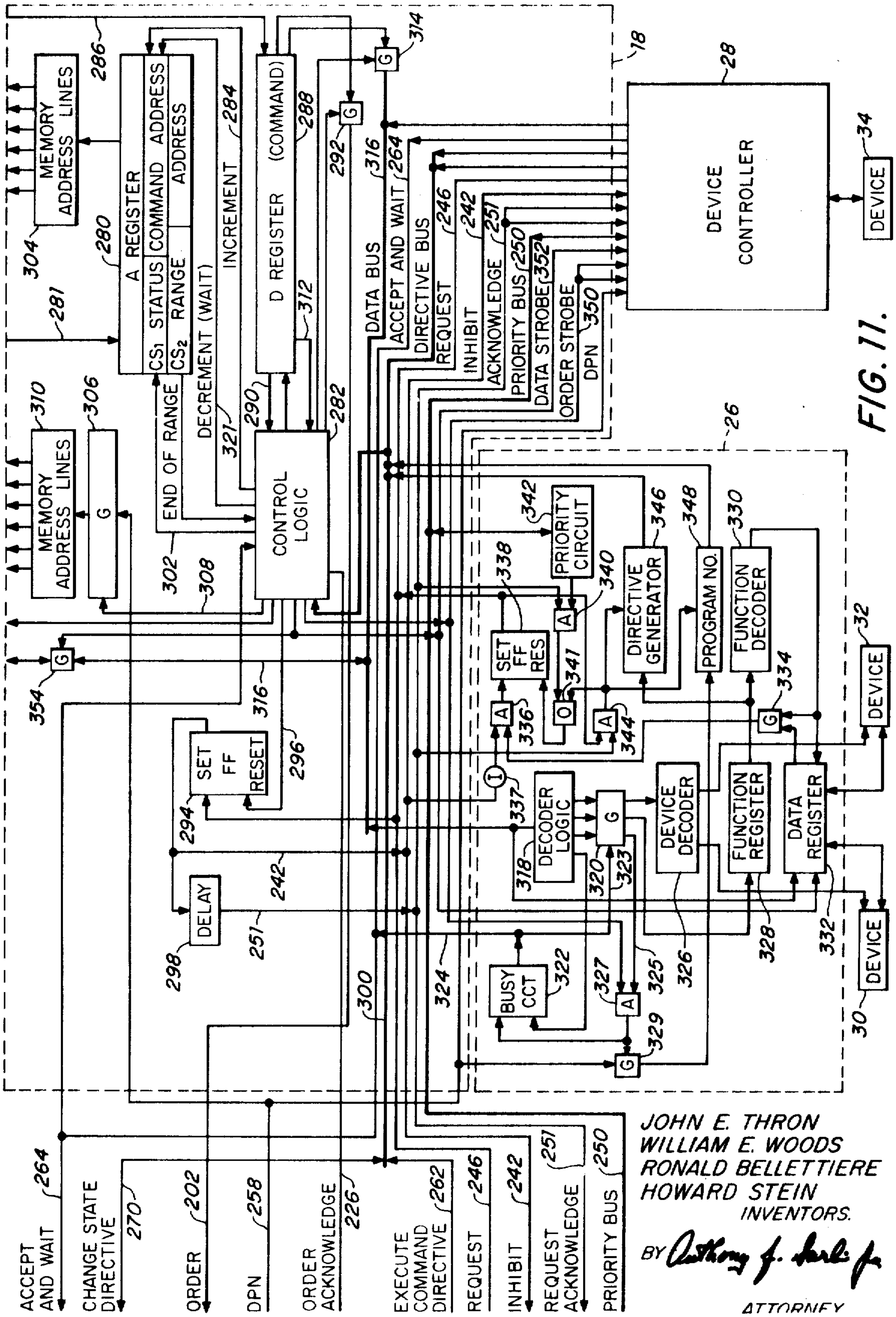
FIG. 11 is a detailed block diagram of portions of an input/output processor and device controllers as shown in FIG. 1.

A more detailed description of a central processor 12, multiprocess controller 24 and an input/output processor means including an input/output processor 18, two device controllers 26, 28 and three devices 30, 32, 34, is made with reference to FIGS. 9, 10, and 11, respectively. In FIG. 9 there is shown a central processor 12 having an IAF register 150, for storing the active program number (APN), gate 152, for gating out the active program number, the currently executing central processor program, and gate 154 for gating in the demand process number (DPN), the highest priority SEQUENCING or COMMITTED central processor program, block 88, FIG. 2, as determined by multiprocess controller 24, upon a signal from the interrupt algorithm circuits 156 responsive to an output from comparator 158 indicating that the APN and DPN are no longer the same, i.e., the APN is no longer the highest priority SEQUENCING or COMMITTED central processor program requesting service from the central processor 12. Both portions PS1 64 and PS2 66 of the program status word, FIG. 3, are kept in $R_P$ register 160; where the address portion, bits 12 through 31 are normally incremented by a signal on line 162 from the arithmetic and logic circuits 164 of the central processor 12 each time an instruction of the program is executed. Instructions retrieved from storage 10 in accordance with the address supplied by the program status word 62 in register 160 are received in $R_m$ buffer register 166 from whence the address portion is used to form an effective address and sent to RKL register 168 and the instruction portion is sent to RIJ register 170. When the APN program status word 62 is register 160 is to be exchanged for a DPN program status word pursuant to the interrupt algorithm, the APN program status word is returned to storage 10 and the DPN program status word is presented to register 160 through buffer register 166. When a control process instruction 94, FIG. 5 containing an order 102, FIG. 6, is received the control process instruction decoder logic 174 actuates gate 176 permitting the order 102 in RKL address register 168 to pass to the multiprocess controller 24 on line 178, activates gate 180 permitting the APN to pass to the multiprocess controller 24 on line 182, and energizes the inhibit circuit 184 to prevent the DPN on line 186 from reaching gate 154 and comparator 158. When, the order 102 on line 178 has been carried out by the multiprocess controller 24, an acknowledge on line 88 from multiprocess controller 24 deenergizes control process instruction decoder logic 174 deactivating gates 176, 180 and opening the order line 178 and APN line 182 and deenergizing inhibit circuit 184 to permit DPN to pass to gate 154 and comparator 158, if DPN is not equal to APN, whereupon the interrupt algorithm circuits are energized.

The central processor fill algorithm, block 146, FIG. 2, is developed in the arithmetic and logic circuits 164 and distributed throughout the system in response to actuation of the system initialize and start switches on the system control panel 56. It is sent to the multiprocess controller 24 on line 190.

In operation, the central processor 12 may be caused to switch its processing efforts from one program to another by either an order in the series of instructions it is executing for the program it is presently controlling or by an other interrupt which effects the central processor activity states indicators 80 so that the presently executing program is not the highest priority SEQUENCING or COMMITTED program, i.e., APN and DPN are not the same number.

In the former situation the presence of an order 102 in register 168 causes control process instruction decoder logic 174 to enable gate 176 to pass the order 102 on line 178 and to enable gate 180 to pass the APN on line 182 to the multiprocess controller 24, and to activate inhibit circuit 184 to prevent the DPN on line 186 from reaching gate 154 and comparator 158. After the order 102 has been carried out by the multiprocess controller 24, i.e., the target program has been identified and upgraded and the issuing program has been downgraded, an acknowledge through decoder logic 174 causes gates 176, 180 and inhibit circuit 184 to be deenergized. The identity of the highest priority SEQUENCING or COMMITTED program, DPN, is now permitted to reach gate 154 and comparator 158. DPN may be the target program of the order 102 sent to the multiprocess controller 24, or another one, which became the highest priority SEQUENCING or COMMITTED program as a result of the downgrading of the issuing program, the APN, or it may be the same as the APN. The response of the central processor 12 is indifferent to the source of the change in the DPN, i.e., whether the source was an order 102 of the program in the central processor or another type of interrupt. When the DPN reaches comparator 158 it is compared with the APN on line 192 from register 159. An indication of a difference by comparator 158 initiates operation of the interrupt algorithm circuit 156 which enables gate 152 to pass the active program number, APN, to register 168 whereby the program status word 62 in register 160 is returned to storage 10 through adder 172. Next a signal from interrupt algorithm circuits 156 enables gate 154 to pass the DPN to register 150 and a signal on line 192 to storage 10 causing the program status word for the DPN, which has now passed through gate 154 to become the APN as well, to be delivered to register 160 through register 166.

Multiprocess controller 24, FIG. 10, includes a decoder 200 for interpreting the target process 104, inter process 106, and intra process 108, FIG. 6, of an order either from central processor 12 on line 178 or input/output processor 18 on line 202. The target program of the order is identified on line 204 which enables the one of the gates 206 associated with the central processor activity state indicators 80, or one of the gates 208 associated with the input/output processor activity state indicators 84 depending upon whether the target program is a central processor program or channel program. The alteration to the activity state of the target program from the inter process portion 106 is then directed on line 210 through that particular enabled one of gates 206, 208 to upgrade the target program through its associated activity state indicator. Finally, the attention to the activity state of the issuing program is derived from the intraprocess 108 portion of the order and placed on line 212. Depending upon whether the issuing program is a central processor program or a channel program, the activity state change on line 212 is directed either through the one of gates 206 enabled by APN line 182 to the one of gates 208 enabled by the signal on line 214 from the highest priority sequencing logic 216. When the signal appears on the intraprocess line 212 execution of the order 102 by decoder 200 has been completed, and that signal is supplied to both the central processor order complete circuit 218 and the input/output processor order complete circuit 220. The presence of a second signal at one of those order complete circuits 218, 220 from its associated flip-flop 222, 224, respectively, indicates that the order originated in the related processor and that order complete circuit is thereby enabled to indicate completion of the order by an acknowledge on either line 188 to central processor 12 or line 226 to input/output processor 18.

Each of central processor activity state indicators 80 includes three flip-flops 228, the third one being a mask to prevent response to an external interrupt unless it has been first enabled by another signal. The activity state of each of indicators 80 is provided to the highest priority sequencing or committed logic decoder 230 which identifies the sequencing or committed program having the highest priority according to number 82 by placing that number as the DPN on line 186. Any one or more of the central processor activity state indicators 80, typified in FIG. 10 by the indicator 80, number 15, may also have its state changed by an external interrupt from external interrupt source 58 through interrupt decode 232.

Each of input/output processor activity state indicators 84 includes two flip-flops 234. The activity state of each of indicators 84 is provided through gate 236 to highest priority sequencing logic circuit 216 that identifies the sequencing program having the highest priority according to numbers 86. The conditions of the flip-flops 228 which represent the four activity states of the central processor programs is shown in CHART IV.

| FF1 | MASK FF | FF2 | STATE |
|---|---|---|---|
| Reset | Reset | Reset | Stopped |
| Set | Reset | Reset | Enabled |
| Set | Set | Reset | Sequencing |
| Set | Set | Set | Committed |

CHART IV and the condition of the flip-flops 234 which represent the four activity states of the channel programs is shown in CHART V.

| FF1 | FF2 | State |
|---|---|---|
| Reset | Reset | Stopped |
| Reset | Set | Waiting |
| Set | Set | Sequencing |
| Set | Reset | Engaged |

CHART V

If one or more of the channel programs 68 is in the SEQUENCING state the output from circuit 216 to the program sequencing detector 238 develops a ready signal to AND-circuit 240. If no inhibit is being put out by input/output processor 18 on line 242, then a second signal is provided through inverter 241 and AND-circuit 240 sets flip-flop 244. The set output of flip-flop 244 develops a request on line 246 to input/output processor 18 which is answered by an inhibit on line 242 which, as discussed in reference to FIG. 2, supra, prevents any other controllers from making a request. Meanwhile the priority circuit 248 in conjunction with the priority circuits of the device controllers interconnected by priority bus 250 has resolved any conflict between controllers that have already made a request. Then when the leading edge of the acknowledge signal 251 from the input/output processor 18 reaches AND-circuit 252, if multiprocess controller 24 is not the highest priority controller requesting service, a signal from AND-circuit 252 resets flip-flop 244. But if no other controller has outranked multiprocess controller 24 in its bid for service, the lagging edge of the acknowledge signal appears concurrently with the set output from flip-flop 244 at AND-circuit 254 whose output simultaneously enables gate 256 to pass the identification of the highest priority sequencing program determined by circuit 216 on DPN line 258 to input/output processor 18, enables execute command directive generator 260 to send that directive on line 262 to input/output processor 18 and reset flip-flop 244.

In addition to the interrupts originating from an order 102 in a control process command or control process instruction, FIG. 5, there are two other types of interrupts that may effect a channel program. An accept or a wait signal, as previously described in the discussion of FIG. 2, appearing on accept and wait line 264 from a device controller when it is being addressed by an IOT, FIG. 7, is submitted to accept and wait decoder 266 which through OR-circuit 268 places in the ENGAGED or WAITING state, respectively, the one of activity state indicators 84 controlled by the one of gates 208 enabled by a signal on line 214. And a change state directive, appearing on line 270 from a device controller is submitted to change state directive decoder 272 which changes from the ENGAGED to the SEQUENCING state the one of activity state indicators 84 controlled by the one of gates 208 enabled by a signal on line 214. LIne 214 enables the one of gates 208 controlling the activity state indicator 84 representing the channel program currently identified as the highest priority sequencing program.

Input/output processor 18 executes channel programs 68 using the address present in bits 12 through 30 of CS1 72 of a channel status word 70 in A register 280, FIG. 11. Each time that a command is retrieved from storage 10, interpreted and executed, control logic 282 increments with a signal on line 284 the address portion of CS1 72. Commands retrieved from storage 10 on line 286 are placed in D-register 288. Execution may continue in this manner until the process is removed from the sequencing state such as when a control process command, FIG. 5, bearing an order 102, FIG. 6, appears in the D-register 288. When that occurs a signal on line 290 causes control logic 282 to enable gate 292 to place the order on line 202 for delivery to the multiprocess controller 24 which processes the order as discussed supra with reference to FIG. 10. The multiprocess controller 24 may then seek service for a new highest priority sequencing channel program submitted with the ready, request, inhibit, priority, acknowledge sequence previously discussed. When the request on line 246 reaches flip-flop 294, that flip-flop having been previously reset by an nd of algorithm signal on line 296, that flip-flop now becomes set and the set output appears on line 242 as the inhibit signal, through delay 298 appears on line 251 as the request acknowledge signal. When the request has been carried out the execute command directive on line 262 through directive bus 300 causes the control logic 282 to enable register 280 via line 302 to transfer CS1 72 to storage 10 through memory address lines 304 and to enable gate 306 via line 308 to pass the DPN on line 258 to memory address lines 310 to retrieve from storage 10 the CS1 72 portion of the channel status word corresponding to the program represented by that DPN and place that CS1 72 portion in register 280 via line 281.

When an order transmit command 124, FIG. 7, appears in D-register 288 a signal on line 312 to control logic 282 enables gate 314 to put the order transmit command 124 on the data transfer bus 316. At the device controller, typified by device controller 26, identified by the device controller identification 126 portion of the order transmit command 124, the decoder logic circuit 318 decodes the device identity portion 128 and the function 130 portion of the order transmit command 124 and submits it to gate 320. A signal is also sent to the busy circuits 322. If circuits 322 indicate that its device controller 26 is busy, a wait signal is sent on line 324 to the accept and wait line 264. The wait signal places the activity state indicator for the executing program to the WAIT state, and decrements through control logic 282 on line 321 the address portion of CS1 72. If circuit 322 indicates that the device controller is not busy an accept signal is sent on line 324 to accept and wait line 264. The accept signal places the activity state indicator for the program to the ENGAGED state, increments the address portion of CS1 72 and begins the input/output algorithm under control of the CS2 74 for that program. Concurrently with the accept signal, busy circuits 322 send a signal on line 323 to enable gate 320 to accept the order transmit command by passing its information through gate 320. Upon the enabling of gate 320 a signal is sent on line 325 to AND-circuit 327 which upon concurrence of an order strobe from control logic 282 on line 350 enables gate 329 to pass DPN to the program number register 348 and to set the busy circuits to the busy state. Device decoder 326 identifies the one of devices 30, 32 designated by the order transmit command. The function 130 is presented to function register 328 and from there to the function decoder 330 that controls the data register 332 according to the function decoded. When the data register 332 achieves the condition required by the decoder 330, a signal is provided from gate 334. For example, if the function required is a data input that signal is produced when data register 332 has received the data from the proper device, or if the function required is a data output, that signal is produced when the data register is empty. The signal from gate 334, when provided to AND-circuit 336 concurrently with a signal from inverter 337 due to a lack of inhibit signal, sets the request flip-flop 338. The set output of flip-flop 338 places a request on line 246 to flip-flop 294, which if in the reset condition, is placed into the set condition to develop an inhibit signal on line 242. When the leading edge of the acknowledge from delay 298 on line 251 reaches AND-circuit 340, if this device controller is outranked by a higher priority controller, there is also a signal to the AND-circuit 340 from priority circuit 342 and the output from AND-circuit 340 through OR-circuit 341 resets flip-flop 338. If, however, this device controller is not outranked then the flip-flop 338 is still set when the lagging edge of the acknowledge signal reaches AND-circuit 344 which produces an output to directive generator 346 that derives a directive, to send to the input/output processor 18, from the function 130 in the order transmit command supplied to the device controller. The output from AND circuit 344 is also used to reset flip-flop 338 through OR-circuit 341 and to enable the program number register 348 to send the DPN to input/output processor 18 concurrently with the directive from directive generator 346. The input/output processor 18 then responds in accordance with the directive. For example, if the directive was a transfer directive, a data strobe on line 352 to data register 332 and gate 354 initiates the data transfer between the data register 332 and storage 10 on data bus 316. Various other directives, as discussed previously, may also be generated.

Although only one central processor, one input/output processor, and one device controller are shown in detail, any number greater than that may be used in embodiments of the invention as suggested earlier in relation to FIGS. 1 and 2.

Other embodiments will occur to those skilled in the art and are within the following claims:

What is claimed is:

1. A multiprogrammable, multiprocessor computer system comprising:

A. a first processor;

B. a second processor;

C. a main memory coupled with both a first group of programs to be executed in said first processor and a second group of programs to be executed in said second processor, said first processor presently executing one of said programs in said first group and said second processor presently executing one of said programs in said second group;

D. means for generating a first interrupt;

E. means for generating a second interrupt;

F. multiprocess control means coupled with both said first processor and said second processor, said control means comprising:

1. a first plurality of activity state indicators, one indicator of said first plurality for each program of said first group,
2. means for setting said state indicators of said first plurality in a first predetermined priority arrangement so as to indicate an active or inactive condition of the corresponding programs of said first group,
3. a second plurality of activity state indicators, one indicator of said second plurality for each program of said second group,
4. means for setting said state indicators of said second plurality in a second predetermined priority arrangement so as to indicate in active or inactive condition of the corresponding programs of said second group,
5. means responsive to said first interrupt for modifying the activity state of said indicator of said first plurality corresponding to said program being currently executed in said first processor,
6. means responsive to said second interrupt for modifying the activity state of said indicator of said second plurality corresponding to said program being currently executed in said second processor,
7. first means, coupled to said first plurality of indicators and coupled for response after the modifying of said indicators by said means responsive to said first interrupt, for determining the identity of the next program having an active condition and having the highest priority of said programs in said first group,
8. second means, coupled to said second plurality of indicators and coupled for response after the modifying of said indicators by said means responsive to said second interrupt, for determining the identity of a program having an active condition and having the highest priority of said programs in said second group,
9. means for providing said first processor with the identity of the program identified by said first means for determining, and
10. means for providing said second processor with identity of the program identified by said second means for determining;

G. means included in said first processor for interchanging for execution in said processor the program being presently executed with the program identified by said first means for determining; and H. means included in said second processor for interchanging for execution in said second processor the program being presently executed with the program identified by said second means for determining.

2. A system as defined in claim 1 further comprising:

A. means in said first processor for comparing the priority of the program being presently executed therein with the priority of said program identified by said first means for determining; and B. means coupled with said means for comparing for allowing said program being presently executed in said first processor to continue being executed if the priority of the program being presently executed in said processor is greater than the priority of said program identified by said first means for determining.

3. A system as defined in claim 2 further comprising means for suspending the execution of the program being presently executed in said processor and executing the program identified by said first means for determining if the priority of the program being presently executed in said first processor is less than the priority of said program identified by said first means for determining.

4. A system as defined in claim 3 further comprising:

A. second means in said second processor for comparing the priority of the program being presently executed therein with the priority of said program identified by said means for determining;

B. means coupled with said second means for comparing for allowing said program being presently executed in said second processor to continue being executed if the priority of the program being presently executed in said second processor is greater than the priority of said program identified by said second means for determining; and C. means for suspending the execution of the program being presently executed in said second processor and executing the program identified by said second means for determining if the priority of the program being presently executed in said second processor is less than the priority of said program identified by said second means for determining.

5. A system as defined in claim 1 wherein said first processor is a central processor and wherein said second processor is an input/output processor, said system further comprising:

A. a plurality of device controllers coupled with said input/output processor, each of said plurality of device controllers including a first priority means;

and wherein said multiprocessor control means further comprises:

B. a second priority means interconnected by a priority bus to each of said first priority means, C. means responsive to said second means for determining and said input/output processor for submitting a service request to said input/output processor;

D. means responsive to said second priority means for indicating the availability of service from said input/output processor to said control means; and E. means responsive to a request acknowledge from said input/output processor and responsive to said means for indicating, for delivering an execute command directive to said input/output processor.

6. A system as defined in claim 5 wherein:

A. said main memory is adapted to store a channel status word for each of said second group of programs representative of the status of each of said second group of programs, each of said channel status words including first and second parts;

and wherein said input/output processor further comprises:

B. a channel register for holding said first or second part of one of said channel status words;

C. means for transferring into said main memory said first part of said one of said channel status words presently in said channel register;

D. means for transferring into said channel register said first part of a new one of said channel status words in response to identification of said new one of said channel status words by said second means for determining;

E. wherein said first part of said channel status word includes an address of an order transmit command; and F. means for transferring to a second register an order transmit command corresponding to the address in said first part of said new one of said channel status words in said channel register.

7. The system of claim 6 in which said input/output processor includes means for addressing one of said device controllers and includes means for sending said order transmit command in said second register to said one of said device controllers addressed.

8. A system as defined in claim 7 in which said input/output processor further comprises:

A. means responsive to a request from a said device controller or said multiprocess control means, for initiating an inhibit to all said device controllers and said multiprocess control means to prevent further requests from said multiprocess control means and said device controllers;

B. means, pursuant to said inhibit, for initiating an acknowledge to the addressed said device controller;

C. means, responsive to an accept from said addressed device controller to transfer said first part of said channel status word from said first register to said main memory and replace it with said second part; and D. means, responsive to a wait from said addressed device controller, to transfer said first part of said channel status word from said first register to said main memory and replace it with a said first part of a said channel status word of another of said second group of programs identified by said second means for determining.

9. A system as defined in claim 1 in which said main memory stores a program status word for each of said first group of programs representative of the status of each of said first group of programs.

10. A system as defined in claim 9 in which said first processor further comprises:

A. a first register for holding a program status word;

B. a second register for holding the identification code of the program of said first group being presently executed by said first processor;

C. means for comparing the code in said second register with the code of the program identified by said first means for determining; and D. means responsive to said means for comparing for returning the program status word from said first register to said main memory and replacing it with the program status word of the program identified by said first means for determining, and for replacing the code in said second register with the code of the program identified by said first means for determining.

* * * * *